United States Patent [19]
Waibel

[11] Patent Number: 6,003,292
[45] Date of Patent: Dec. 21, 1999

[54] BRUSH MOWER WITH DEFLECTION PLATE

[75] Inventor: Robert J. Waibel, Arlington, Vt.

[73] Assignee: Country Home Products, Inc., Vergennes, Vt.

[21] Appl. No.: 08/889,534

[22] Filed: Jul. 8, 1997

[51] Int. Cl.[6] .................................................. A01D 67/00
[52] U.S. Cl. .................... 56/320.2; 56/16.7; 56/17.4; 56/DIG. 20; 56/DIG. 24
[58] Field of Search ............................ 56/320.1, 320.2, 56/16.7, 2, 10.1, 17.3, 17.4, 314, DIG. 5, DIG. 9, DIG. 12, DIG. 13, DIG. 20, DIG. 24

[56] References Cited

U.S. PATENT DOCUMENTS

| | | | |
|---|---|---|---|
| 3,971,196 | 7/1976 | Stevenson | 56/17.4 X |
| 4,112,656 | 9/1978 | Ranko et al. | 56/320.1 |
| 4,466,235 | 8/1984 | Cole | 56/16.9 |
| 4,633,658 | 1/1987 | Nogawa | 56/255 |
| 4,909,024 | 3/1990 | Jones et al. | 56/16.7 |
| 5,279,100 | 1/1994 | Pruitt et al. | 56/1 |
| 5,331,794 | 7/1994 | Reichle | 56/17.4 |
| 5,465,564 | 11/1995 | Koehn et al. | 56/320.2 |
| 5,481,858 | 1/1996 | Chudy | 56/17.5 |
| 5,628,171 | 5/1997 | Stewart et al. | 56/320.2 |
| 5,657,620 | 8/1997 | Thagard et al. | 56/320.1 X |

OTHER PUBLICATIONS

Brochure: "The Dr® Field and Brush Mower", by Country Home Products, Inc. (1997).
Brochure: "Because it's a Jungle out there.", by Billy Goat Industries, Inc. (date unknown).
Brochure: "Roof Heavy–Duty Mowers", by Roof Equipment Manufacturing Co. (date unknown).
Brochure: "Brush Mower", by Southern Tiller, (1996).
Brochure: "Hi–Wheel Weed & Brush Cutters", by Bachtold Bros. (date unknown).

*Primary Examiner*—Thomas B. Will
*Assistant Examiner*—Arpad Fabian Kovacs
*Attorney, Agent, or Firm*—Downs Rachlin & Martin PLLC

[57] ABSTRACT

A brush mower having deflection plate for reducing the amount of cut vegetation forwardly discharged from the intake opening at the front end of the deck. The mower additionally comprises a motor connected to the deck. The latter includes a top portion and a skirt portion extending downwardly on three sides from the top portion, thereby defining a cutting chamber. The deck also includes a blade rotatably mounted within the cutting chamber and a side discharge opening. The deflection plate has a height that is less wide than the height of the skirt portion. The deflection plate changes the airflow in the cutting chamber so that cut vegetation is directed out the side discharge opening, rather than out the intake opening.

23 Claims, 3 Drawing Sheets

BRUSH MOWER WITH DEFLECTION PLATE

FIELD OF THE INVENTION

The present invention relates to mowers having an open front end, and more particularly to structure for modifying airflow in the cutting deck of such mowers so as to enhance cutting action of the deck.

BACKGROUND OF THE INVENTION

Most types of mowers, such as lawn mowers and brush mowers, include a deck with a downwardly extending skirt. Typically, the skirt is of uniform width and forms a cutting chamber surrounding the mower blade. The skirt generally includes a discharge opening for discharging cut vegetation.

Unlike conventional lawn mowers, however, brush mowers require a wide intake opening at the front end of the deck so that large brush (e.g., saplings) and other dense vegetation (including tall grass) can be readily received into the cutting chamber. This allows for the mower blade to efficiently cut the vegetation, which is often significantly taller than the height of the opening at the front end of the mower deck.

When brush mowers are used to cut grass and other leafy vegetation in a field or lawn, two disadvantages of the open front cutting deck become apparent. First, because the circular airflow created by the blade's circular motion is diverted as it encounters the open front, uncut grass ahead of the mower tends to be blown downward reducing the cleanness of the cut. Second, a significant portion of the cut vegetation is often ejected from the cutting chamber via the intake opening rather out the discharge opening. This is undesirable because forwardly discharged cut vegetation can build up in front of the mower, increasing the volume of material to be cut, thereby requiring the motor to work harder.

To date, solving the problem of forward discharge of cut vegetation from a brush mower has presented a dilemma. If the skirt of the deck is extended to block the front end in the manner typical for conventional lawn mowers, forward discharge of vegetation will be restricted. Unfortunately, a key feature of the brush mower, the ability to cut tall grass and woody vegetation, will be severely compromised with such approach.

Another possible solution is to reduce the height of the skirt across the front of the cutting deck relative to the skirt height on the remainder of the deck so as to achieve a partial intake opening at the front of the deck. For example, U.S. Pat. No. 4,633,658 ("the '658 patent") discloses a lawn mower with a downwardly extending skirt which is shorter in height in the front end than in the back end. A discharge opening is provided in the back end of the deck. This mower is designed to be attached to a conventional portable weeder. While the skirt at the front may act to prevent forward discharge of grass from the mower, the intake opening is not believed to be of sufficient size to permit tall and woody vegetation to be cut quickly and easily, if at all. Indeed, while the height of the skirt is less in front than in the rear, it appears the deck was designed this way to allow the operator some latitude in tilting the mower back and forth about the set of wheels, in a manner common to portable weeders.

Thus, the motivation for the reduced-height skirt at the front of the deck of the '658 patent is different than the motivation for an open front end on the deck of a brush mower. Moreover, use of a deck of the type described in the '658 patent on a brush mower would significantly reduce the size of the intake opening, which in turn would critically impact the ability of the brush mower to cut tall vegetation.

Thus, there is a need for a deck design that will substantially reduce the amount of cut vegetation that is forwardly discharged in brush mowers, while at the same time not significantly reducing the size of the open front end of the mower.

SUMMARY OF THE INVENTION

The present invention is a mower comprising a motor and a deck connected to the motor, wherein the deck includes a top portion having front, rear, and first and second side edges and an inner surface. A skirt portion is attached to the top portion adjacent the rear, first and second edges, thereby defining a cutting chamber having an intake opening adjacent the front edge. The skirt portion has a height H and a rotation circumference. A removable deflection plate is attached to the top portion of the deck adjacent the intake opening so as to extend downwardly from the inner surface into the cutting chamber. The deflection plate extends along a portion of the rotation circumference, and has a height H' that is less than the height H of the skirt portion.

The deflection plate can be rigid or flexible, and may be made of any of a number of materials, such as metal, rubber and plastic. In addition, the deflection plate can be in the form of a screen. The deflection plate has a sufficiently narrow width that the intake opening remains essentially wide open. Even though the deflection plate does not extend down to the horizontal plane of the cutting blade, it is very effective in substantially reducing the forward discharge of cut vegetation (especially grass) because it reduces the volume of airflow discharged from the front of the deck while preserving the circular flow of air above the area swept by the blade, thereby enhancing discharge of cut material from the side-located discharge chute.

Another aspect of the invention is a cutting deck having the features described above relative to the mower of the present invention.

DETAILED DESCRIPTION OF THE INVENTION

Figure 1:
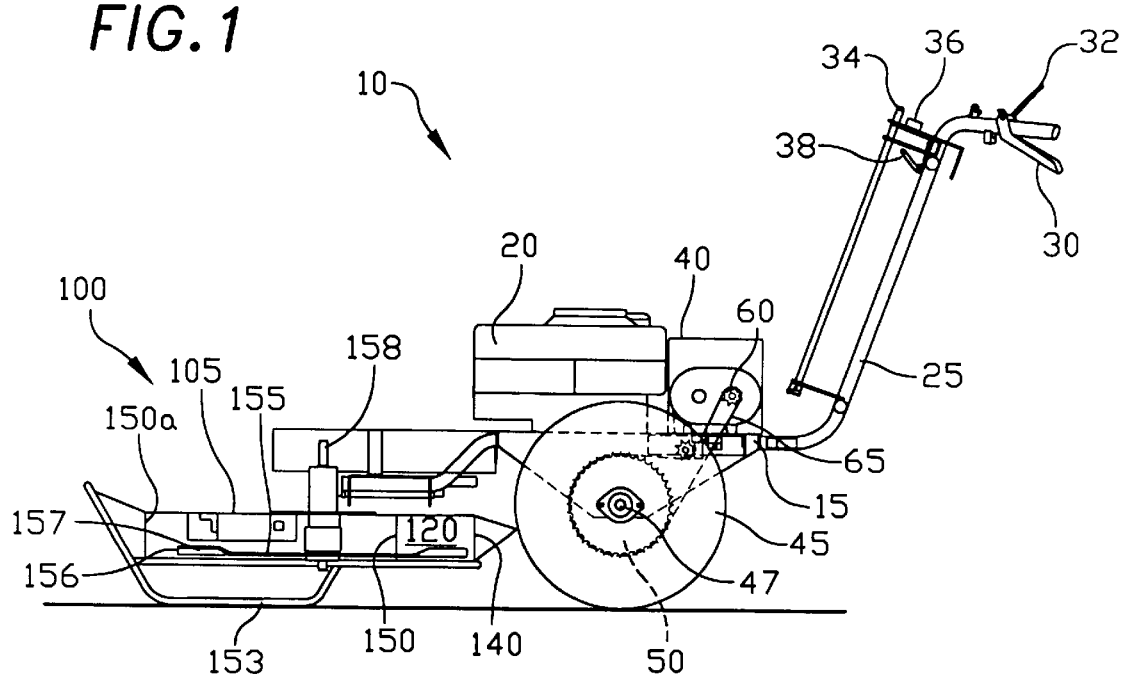
FIG. 1 is a side elevation view of the mower of the present invention, with a section of the skirt portion of the deck being removed to reveal the interior of the deck cutting chamber and certain details of the blade and motor drive assemblies being shown in phantom view.
Figure 2:
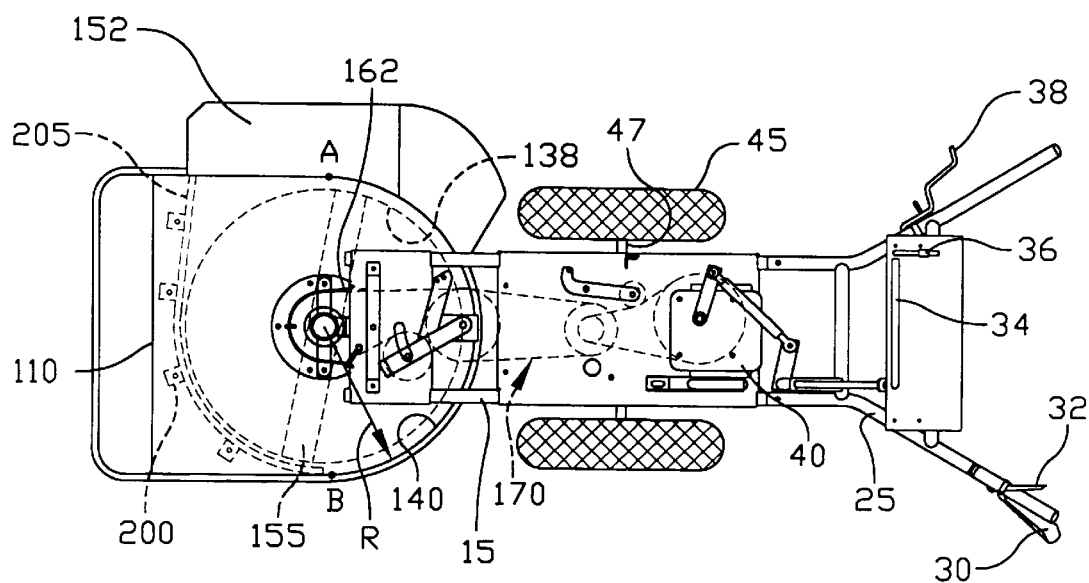
FIG. 2 is a top view of the mower of FIG. 1, with details of the cutting deck and blade drive assembly being shown in phantom view.
Figure 3:
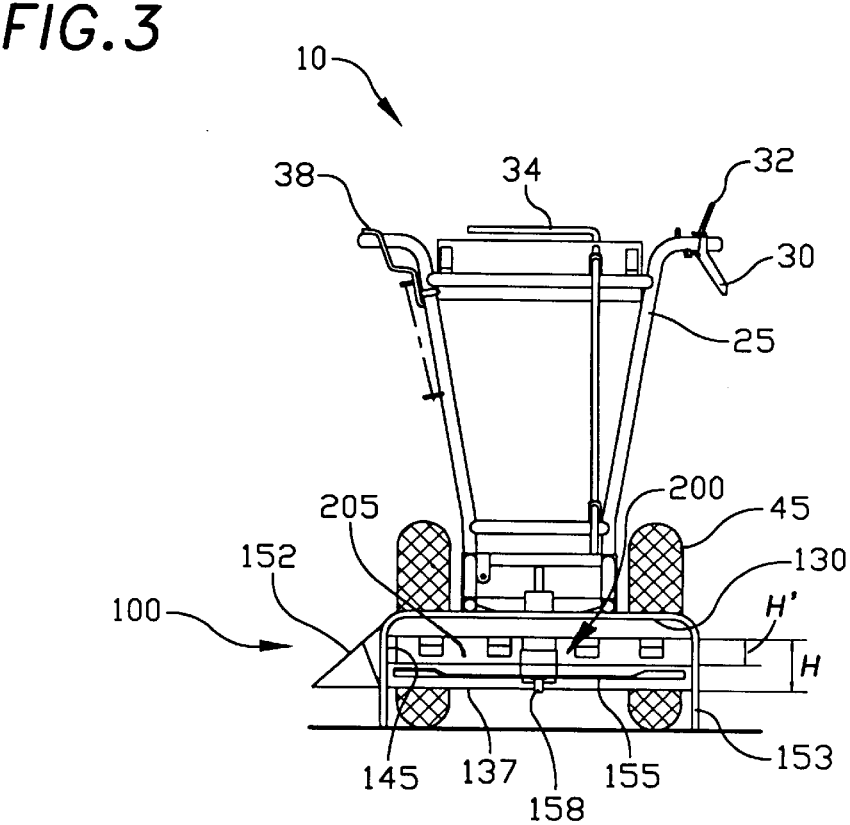
FIG. 3 is a front elevation view of the mower of the present invention, with the motor, transmission and associated controls being removed for clarity of illustration.
Figure 5:
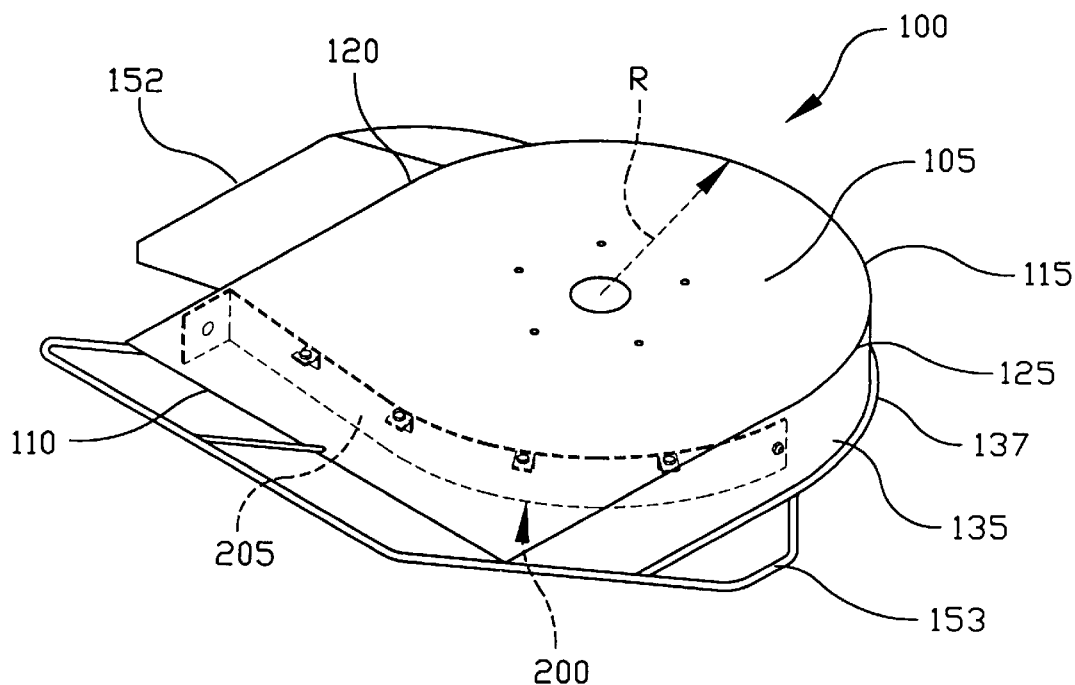
FIG. 5 is a perspective view of the deck, with the deflection plate being shown in phantom view.

Referring to FIGS. 1–3, the present invention is a brush mower 10 having a frame 15 for supporting various elements of the mower, and a motor 20 mounted on top of frame 15. Also attached to frame 15 is a handle 25 which includes a wheel drive activation lever 30, a presence lever 32, a gear shift level 34, a throttle 36 and a blade engagement handle 38.

Mower 10 includes a transmission 40 (see FIGS. 1 and 2) attached to motor 20 for transmitting power at different gear settings to a set of wheels 45 positioned on either side of frame 15 proximate motor 20 (see FIG. 2). Wheels 45 are connected to one another and to frame 15 via an axle assembly 47 that is rotatably mounted to the frame. Mower 10 also includes a differential (not shown) coupled with axle 47 and a sprocket 50 (see FIG. 1) attached to the differential. Sprocket 50 is connected to transmission 40 via transmission a drive shaft gear 60 and drive chain 65. When drive shaft gear 60 of transmission 40 is engaged by depressing lever 30, mower 10 becomes self-propelled.

To transmit power from motor 20 to the deck (described below) of mower 10, a belt drive train assembly 70 is provided. Drive train assembly 70 includes a series of belts, pulleys and pulley control arms of the type well known in the art for selectively engaging or disengaging a rotatable blade spindle (described below) from motor 20 when blade engagement handle 38 is depressed.

Mower 10 also includes a deck 100 attached to the front portion of frame 15. With reference now to FIGS. 1–5, deck 100 has a substantially horizontally extending top portion 105 with a front edge 110, a rear edge 115, a first side edge 120, a second side edge 125 and an inner surface 130 (see FIG. 3). Deck 100 also includes a substantially vertically extending skirt portion 135 having a lower edge 137. Skirt portion 135 is attached to top portion 105 at or immediately adjacent rear edge 115, first side edge 120 and second side edge 125, thereby defining a cutting chamber 140 (shown in FIGS. 1–3). Skirt portion 135 does not extend along front edge 110. As a result, deck 100 includes an intake opening 145 extending from first side edge 120 to second side edge 125.

Figure 4:
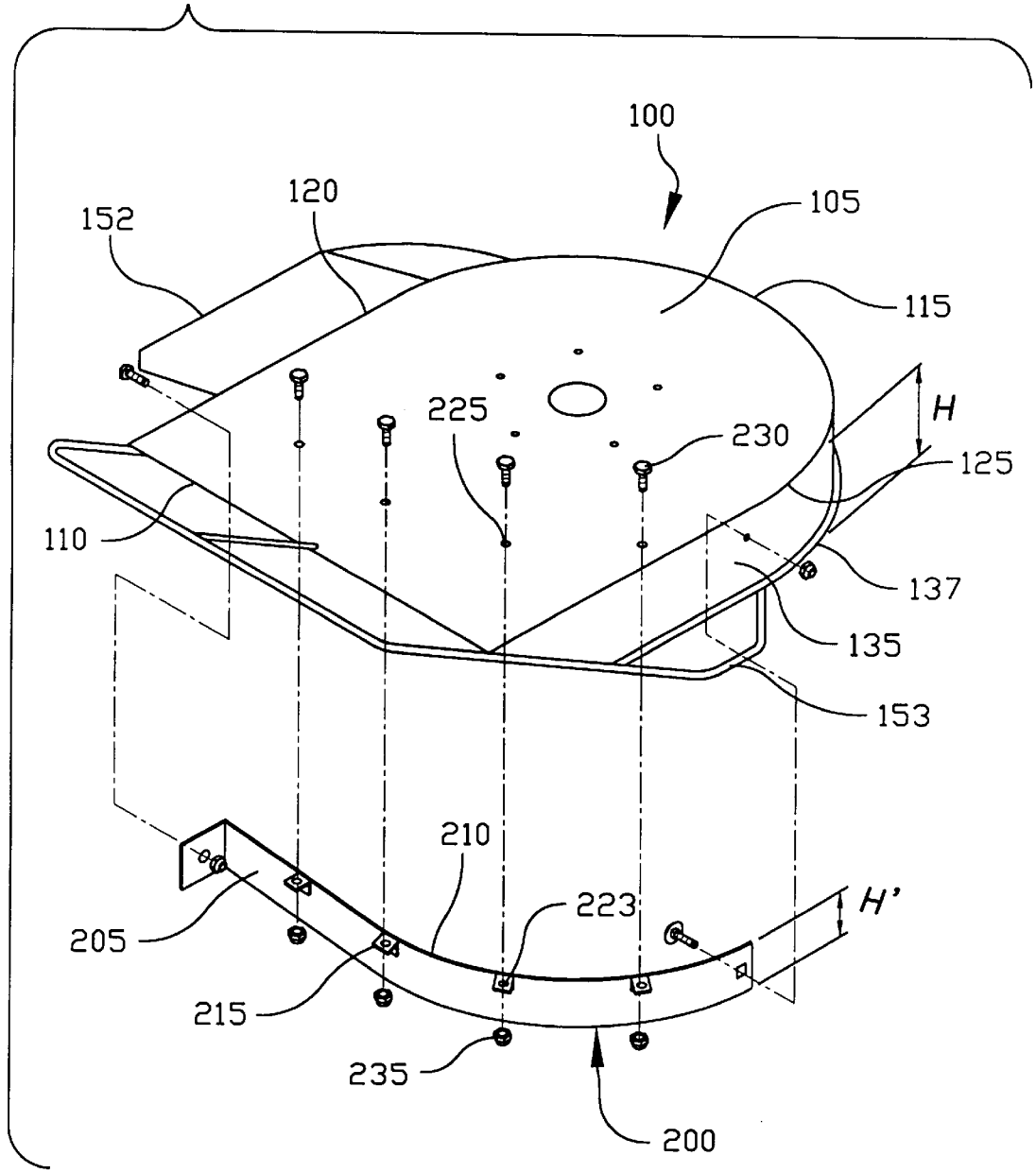
FIG. 4 is an exploded perspective view of the deck and deflection plate of the present invention.

Skirt portion 135 has a height H (see FIGS. 3 and 4). Height H will vary depending upon various design parameters known to those skilled in the art. However, height H preferably ranges from 3 to 8 inches, with a height H of 4.5 inches being used in a preferred embodiment of the invention.

The configuration of top portion 105 and skirt portion 135 are selected so that the section of the skirt portion attached to rear edge 115 and to the rearward-most portions of side edges 120 and 125, between portions A and B (FIG. 2), has a curved configuration, i.e., a radius of curvature R (FIG. 2), corresponding to that of rotation circumference 160 (FIG. 2). That is, the curved rear section of skirt portion 135 extends along and is spaced radially outwardly a substantially uniform distance from rotation circumference 138.

Deck 100 further includes a side discharge opening 150 (see FIG. 1) in first side edge 120, which allows for the discharge of cut vegetation from cutting chamber 140. Discharge opening 150 could also be formed in second side edge 125. A discharge chute 152 is attached to top portion 105 and side portion 120 adjacent opening 150.

Deck 100 also includes skids 153 which are attached to skirt portion 135 so as to extend below lower edge 137. Skids 153 support deck 100 and provide a surface that slides along the ground as mower 10 is propelled.

Deck 100 further comprises a cutting blade 155 having an outer edge 156 and upturned suction-creating portions 157. A blade spindle 158 is rotatably mounted to deck 100. Blade 155 is attached to spindle 158 for rotational movement in cutting chamber 140 such that outer edge 156 of blade 155 traverses rotation circumference 138 (FIG. 2). Blade spindle 158 is attached to a drive pulley 162 that is connected to motor 20 via belt drive train assembly 70.

With reference to FIGS. 2–5, deck 100 includes a removable deflection plate 200 having an upper edge 210. Deflection plate 200 is attached to top portion 105 of deck 100 at inner surface 130 so that upper edge 210 contacts the inner surface and the deflection plate extends downwardly into cutting chamber 140. Deflection plate 200 has a curved configuration corresponding to that of rotation circumference 138.

More specifically, deflection plate 200 has a radius of curvature for the majority of its length that is the same as the radius of curvature R (see FIG. 2) of the section of skirt portion 135 extending between points A and B on side edges 120 and 125, respectively. Deflection plate 200 is attached to top portion 105 adjacent, and slightly rearwardly of, front edge 110 so that the plate curves forwardly, beginning at point B, along the radius of curvature R of the rear section of skirt portion 135 to a location near discharge opening 150. Section 205 (see FIGS. 2, 4 and 5) of barrier plate 200 closest to discharge opening 150 has a decreasing radius of curvature, and immediately adjacent the discharge opening is substantially straight so as to intersect the leading edge 150a of the discharge opening 150.

Deflection plate 200 has a height H' that is less than the height H of skirt portion 135. See FIG. 3. In a preferred embodiment of deck 100, skirt portion 135 has a height H that is about 4.5 inches, as noted above, and deflection plate 200 has a height H that is about 2 inches. The precise height H' for deflection plate 200 may be selected empirically by selecting different heights and then monitoring the effect on (1) forward discharge of vegetation through intake opening 145, and (2) the ability of mower 10 to cut tall grass and other vegetation. If height H' of deflection plate 200 is too small, an unacceptably large amount of vegetation will be discharged through intake opening 145. If height H' of deflection plate 200 is too large, then the ability of mower 10 to cut tall grass and other leafy vegetation will be unacceptably reduced.

Barrier plate 200 may be made of a rigid material, such as plastic, rigid rubber or steel. Alternatively, deflection plate 200 can be made of a flexible material, such as plastic, rubber, or thin metal. In addition, deflection plate 200 can be in the form of a screen composed of above-named materials, or other similar materials known in the art.

In a preferred embodiment, deflection plate 200 is removably attached to top portion 105 of deck 100 at inner surface 130. With continuing reference to FIG. 4, this can be accomplished, for instance, by providing a plurality of screw plates 215 fixed adjacent upper edge 210 of deflection plate 200, wherein each screwplate 215 has an aperture 223 therein. Apertures 225 are formed in top portion 105 in positions corresponding to those of apertures 223 in screw plates 215. Threaded bolts 230 are passed through apertures 223 and 225 and secured with nuts 235.

It is preferred that deflection plate 200 be removably attached to deck 100 because the deflection plate will enhance the cutting action of mower 10 more with certain types of vegetation than with others. Simple trial and error is the best way to determine when deflection plate 200 should be used. However, it has been shown that deflection plate 200 substantially decreases the amount of forwardly discharged grass clippings when cutting grass, while at the same time providing a cleaner cut and reducing the amount of horsepower needed from the motor to perform the cut.

With reference now to FIGS. 1–3, the operation and cutting dynamics of mower 10 are now described. After starting motor 20, cutting blade 155 is engaged by depressing presence lever 32 and handle 38, which causes belt drive assembly 70 to couple drive pulley 162 on blade spindle 158 with motor 20. Depressing lever 30 engages drive shaft gear 60 on transmission 40, which causes chain 65 to drive sprocket 50, which in turn causes the differential (not shown) to cause axle 47 to rotate, thereby driving wheels 45.

To appreciate the function of deflection plate 200, the cutting dynamics of mower 10 when cutting tall grass without the deflection plate attached to deck 100 is now described. As mower 10 encounters tall grass, the tall grass enters intake opening 145, whereupon cutting blade 155 cuts the tall grass, creating grass clippings. The grass clippings are drawn up into the cutting chamber and momentarily suspended therein by the upward, circular airflow pattern created by upwardly extending portions 157 of rotating cutting blade 155. The grass clippings then follow the airflow pattern around skirt portion 135 of deck 100. However, when the airflow pattern within cutting chamber 140 of deck 100 encounters intake opening 145, a portion of the airflow exits the intake opening, carrying with it a portion of the grass clippings suspended in cutting chamber 140. In addition, when the airflow within cutting chamber 140 encounters discharge opening 150, another portion of the airflow exits the discharge opening, carrying with it other suspended grass clippings remaining in cutting chamber 140.

Now the cutting dynamics of mower 10 when cutting tall grass with deflection plate 200 attached to deck 100 is described. With deflection plate 200 attached to top portion 105 of deck 100, as described above, the circular, upwardly extending airflow pattern described above is created in cutting chamber 140. However, the airflow pattern within cutting chamber 140 is significantly altered by the presence of deflection plate 200. A substantial portion of the airflow within cutting chamber 140 is redirected away from intake opening 145 towards and out discharge opening 150. As a result, a substantial portion of grass clippings suspended in the cutting chamber 140 that would otherwise be discharged from intake opening 145 are carried out discharge opening 150.

It is important to note that the alteration of airflow necessary to achieve the desired effect of substantially reducing the forward discharge of cut vegetation is accomplished without substantially reducing the size of intake opening 145. Indeed, discharge plate 200 does not directly deflect by impact any significant amount of cut vegetation that would otherwise be forwardly discharged. Although the invention has been described in the context of brush mowers, it is to be appreciated the invention has utility in other types of mowers, including mulching mowers and, in some cases, mowers having a closed front-end deck.

While the present invention has been described in connection with the preferred embodiments, it will be understood that it is not so limited, but rather is intended to cover all alternatives, modifications, and equivalents as may be included within the spirit and scope of the invention described and claimed herein.

What is claimed is:

1. A mower comprising:
   a. a motor;
   b. a deck connected to said motor, said deck including:
      i. a top portion having a front edge, a rear edge, a first side edge, a second side edge and an inner surface;
      ii. a skirt portion attached to said top portion adjacent said rear edge and said first and second side edges so as to define a cutting chamber having an intake opening adjacent said front edge, said skirt portion having a discharge opening through which material may be discharged from said cutting chamber, a height H and a rotation circumference; and,
      iii. a deflection plate attached to said top portion adjacent said intake opening so as to extend from said inner surface into said cutting chamber, wherein said deflection plate is curved along at least some of its length, extends along a portion of said rotation circumference and has a height H' that is less than said height H, further wherein said deflection plate is designed so as not to completely block said discharge opening.

2. A mower according to claim 1, wherein said height H' ranges from 1 to 4 inches.

3. A mower according to claim 2, wherein said height H' is about 2 inches.

4. A mower according to claim 1, wherein said deflection plate is positioned rearwardly of said front edge.

5. A mower according to claim 1, wherein said deflection plate is rigid.

6. A mower according to claim 1, wherein said deflection plate is flexible.

7. A mower according to claim 1, wherein said deflection plate is a screen.

8. A mower according to claim 1, wherein said deflection plate is removably attached to said top portion.

9. A mower according to claim 1, further comprising a frame, wherein said motor and said deck are attached to said frame, a blade rotatably mounted to said deck, and drive means for transmitting power from said motor to said blade.

10. A mower according to claim 1, wherein said skirt has a bottom edge and said intake opening is open from said inner surface to said bottom edge.

11. A mower according to claim 1, further including a blade mounted for rotation relative to said deck, wherein said deflection plate does not extend below said blade.

12. A mower according to claim 1, wherein said deflection plate does not block any portion of said discharge opening.

13. A deck for a mower, the deck comprising:
   a. a top portion having a front edge, a rear edge, a first side edge, a second side edge and an inner surface;
   b. a skirt portion attached to said top portion adjacent said rear edge and said first and second side edges so as to define a cutting chamber having an intake opening adjacent said front edge, said skirt portion having a discharge opening through which material may be discharged from said cutting chamber, a height H and a rotation circumference; and,
   c. a deflection plate that is curved along at least some of its length and is attached to said top portion adjacent said intake opening so as to extend from said inner surface into said cutting chamber, wherein said deflection plate extends along a portion of said rotation circumference and has a height H' that is less than said height H, further wherein said deflection plate does not completely block said discharge opening.

14. A deck according to claim 13, wherein said height H' ranges from 1 to 4 inches.

15. A deck according to claim 13, wherein said deflection plate is removably attached to said top portion.

16. A deck according to claim 13, wherein said deflection plate is rigid.

17. A deck according to claim 13, wherein said deflection plate is flexible.

18. A deck according to claim 13, wherein said deflection plate is a screen.

19. A deck according to claim 13, wherein said skirt has a bottom edge and said intake opening is open from said inner surface to said bottom edge.

20. A deck according to claim 13, further including a blade mounted for rotation relative to said deck, wherein said deflection plate does not extend below said blade.

21. A mower according to claim 13, wherein said deflection plate does not block any portion of said discharge opening.

22. A mower comprising:
   a. a motor; and
   b. a deck connected to said motor, said deck having:
      i. a cutting chamber having an open bottom portion;
      ii. an intake opening at the front of said deck, said intake opening communicating with said cutting chamber;
      iii. a discharge opening communicating with said cutting chamber;
      iv. a blade rotatably mounted in said cutting chamber, said blade being designed to create airflow patterns in said chamber during rotation; and
      v. an arcuate deflection means mounted in said cutting chamber adjacent said intake opening for modifying said airflow patterns to encourage discharge of material cut by said blade through said discharge opening rather than through said intake opening, wherein said deflection means does not extend below said blade.

23. A deck comprising:
   a. a cutting chamber having an open bottom portion;
   b. an intake opening at the front of the deck, said intake opening communicating with said cutting chamber;
   c. a discharge opening communicating with said cutting chamber;
   d. a blade rotatably mounted in said cutting chamber, said blade being designed to create airflow patterns in said chamber during rotation; and
   e. an arcuate deflection means mounted in said cutting chamber adjacent said intake opening for modifying said airflow patterns to encourage discharge of material cut by said blade through said discharge opening rather than through said intake opening, wherein said deflection means does not extend below said blade.

* * * * *